US012638154B2

(12) United States Patent
Zeng et al.

(10) Patent No.: US 12,638,154 B2
(45) Date of Patent: May 26, 2026

(54) FILL LIGHT AND ELECTRONIC DEVICE

(71) Applicant: VIVO MOBILE COMMUNICATION CO., LTD., Dongguan (CN)

(72) Inventors: Chenxin Zeng, Dongguan (CN); Shudeng Wu, Dongguan (CN); Xubin Lin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 19/340,801

(22) Filed: Sep. 25, 2025

(65) Prior Publication Data

US 2026/0022817 A1 Jan. 22, 2026

Related U.S. Application Data

(63) Continuation of application No. PCT/CN2024/083462, filed on Mar. 25, 2024.

(30) Foreign Application Priority Data

Mar. 31, 2023 (CN) ......................... 202310352383.8

(51) Int. Cl.
*F21V 7/00* (2006.01)
*F21V 7/07* (2006.01)
(Continued)

(52) U.S. Cl.
CPC .............. *F21V 7/0041* (2013.01); *F21V 7/07* (2013.01); *F21V 13/12* (2013.01);
(Continued)

(58) Field of Classification Search
CPC .. A47G 1/0622; F21Y 2105/18; F21V 7/0091
See application file for complete search history.

(56) References Cited

U.S. PATENT DOCUMENTS 4,755,916 A 7/1988 Collins
7,976,192 B2 * 7/2011 Chinniah ................ F21V 5/046 362/249.02
(Continued)

FOREIGN PATENT DOCUMENTS

CN 101156023 A 4/2008
CN 102588787 A 7/2012
CN 116256930 A 6/2023

OTHER PUBLICATIONS

International Search Report issued in corresponding International Application No. PCT/CN2024/083462, mailed Jul. 9, 2024, 5 pages.
(Continued)

*Primary Examiner* — Eric T Eide
(74) *Attorney, Agent, or Firm* — IPX PLLC

(57) ABSTRACT

A fill light and an electronic device are provided. The fill light includes a first reflector, a second reflector, a light-transmitting ring, and a light-emitting light source. The first reflector and the light-transmitting ring are located on a same side of the second reflector, and the light-transmitting ring surrounds the first reflector. The first reflector has a first reflection surface, the second reflector has a second reflection surface, and the first reflection surface is disposed opposite to the second reflection surface. A light-emitting side of the light-emitting light source faces the first reflection surface, and light emitted by the light-emitting light source is emitted from the light-transmitting ring after being reflected by the first reflection surface and the second reflection surface. The first reflection surface, the second reflection surface, and the light-transmitting ring are all rotationally symmetrical about a central optical axis of the light-emitting light source.

16 Claims, 4 Drawing Sheets

(51) Int. Cl.
*F21V 13/12* (2006.01)
*F21V 33/00* (2006.01)
*F21Y 115/10* (2016.01)

(52) U.S. Cl.
CPC ...... *F21V 33/0052* (2013.01); *F21V 2200/20* (2015.01); *F21Y 2115/10* (2016.08)

(56) References Cited

U.S. PATENT DOCUMENTS

| | | | | |
|---|---|---|---|---|
| 2005/0162857 | A1 | 7/2005 | Tsukamoto | |
| 2010/0039822 | A1 | 2/2010 | Bailey | |
| 2011/0292655 | A1* | 12/2011 | Ing | G09F 13/14 362/241 |
| 2012/0201033 | A1* | 8/2012 | Otani | F21S 41/43 362/307 |
| 2012/0250308 | A1* | 10/2012 | Zwak | G02B 19/0061 362/249.02 |
| 2012/0313534 | A1* | 12/2012 | Urtiga | H05B 45/56 362/326 |
| 2019/0346106 | A1* | 11/2019 | Herlin | F21S 41/24 |
| 2020/0285114 | A1* | 9/2020 | Yamashita | G02B 6/0021 |

OTHER PUBLICATIONS

First Office Action issued in related Chinese Application No. 202310352383.8, mailed Jun. 29, 2025, 5 pages.

* cited by examiner

FILL LIGHT AND ELECTRONIC DEVICE

CROSS-REFERENCE TO RELATED APPLICATIONS

This application is a continuation of International Application No. PCT/CN2024/083462, filed Mar. 25, 2024, which claims priority to Chinese Patent Application No. 202310352383.8, filed Mar. 31, 2023. The entire contents of each of the above-referenced applications are expressly incorporated herein by reference.

TECHNICAL FIELD

This application pertains to the field of optical device technologies, and specifically relates to a fill light and an electronic device.

BACKGROUND

With continuous advancements in image shooting capabilities of electronic devices such as mobile phones, there is an increasing demand for photographing with electronic devices, accompanied by ever-emerging photographing scenes. In low-light environments and scenarios such as image shooting at night, it is difficult to capture clear photos, and video recording or live streaming can lead to a poor experience. For this reason, some electronic devices incorporate fill lights for light fill, to ensure satisfactory imaging performance in dark and nighttime scenarios.

However, in a related technology, small-size flashlights are usually used for light fill. The flashlights operate in a high-current instantaneous burst mode, which differs significantly from the continuous illumination of natural light. As a result, the flashlights exhibit poor compatibility with mainstream image processing algorithms, leading to increased processing complexity and unrealistic processing effect. Moreover, due to a compact size and high brightness, the flashlights may cause significant irritation to eyes, making the eyes uncomfortable when capturing portraits. Therefore, the fill lights in the related technology exhibit poor use performance.

SUMMARY

Embodiments of this application are intended to provide a fill light and an electronic device.

According to a first aspect, an embodiment of this application provides a fill light, including a first reflector, a second reflector, a light-transmitting ring, and a light-emitting light source. The first reflector and the light-transmitting ring are located on a same side of the second reflector, and the light-transmitting ring surrounds the first reflector. The first reflector has a first reflection surface, the second reflector has a second reflection surface, and the first reflection surface is disposed opposite to the second reflection surface. A light-emitting side of the light-emitting light source faces the first reflection surface, and light emitted by the light-emitting light source is emitted from the light-transmitting ring after being reflected by the first reflection surface and the second reflection surface. The first reflection surface, the second reflection surface, and the light-transmitting ring are all rotationally symmetrical about a central optical axis of the light-emitting light source.

According to a second aspect, an embodiment of this application provides an electronic device, including the foregoing fill light. The fill light includes a first reflector, a second reflector, a light-transmitting ring, and a light-emitting light source. The first reflector and the light-transmitting ring are located on a same side of the second reflector, and the light-transmitting ring surrounds the first reflector. The first reflector has a first reflection surface, the second reflector has a second reflection surface, and the first reflection surface is disposed opposite to the second reflection surface. A light-emitting side of the light-emitting light source faces the first reflection surface, and light emitted by the light-emitting light source is emitted from the light-transmitting ring after being reflected by the first reflection surface and the second reflection surface. The first reflection surface, the second reflection surface, and the light-transmitting ring are all rotationally symmetrical about a central optical axis of the light-emitting light source.

In this embodiment of this application, the light emitted by the light-emitting light source is reflected to the light-transmitting ring through the first reflection surface and the second reflection surface. The first reflection surface, the second reflection surface, and the light-transmitting ring are all rotationally symmetrical about the central optical axis of the light-emitting light source. Therefore, illuminance distribution of the reflected light of the first reflection surface and the second reflection surface in a circumferential direction thereof is uniform, to form a light ring with soft light perception, moderate brightness, and continuous emission on the light-transmitting ring, so that light of the fill light is more uniform. In addition, the light emitted by the light-emitting light source is reflected between the first reflection surface and the second reflection surface, so that the first reflection surface and the second reflection surface form a dual-reflection structure. The dual-reflection structure can be used for light guidance, to reduce a quantity of reflections of light, and maximize an amount of light guided to the light-transmitting ring. In this way, luminous energy efficiency of the fill light can be significantly improved, so that the fill light has sufficient energy even with a single light source. The fill light disclosed in this application guides light by using a coaxial dual-reflection structure, so that a quantity of light sources of the fill light can be effectively reduced while ensuring optical performance of the fill light. This enables the fill light to be smaller in size, lower in cost, and better in heat dissipation performance. Therefore, use performance of the fill light is improved.

DETAILED DESCRIPTION

Figure 1:
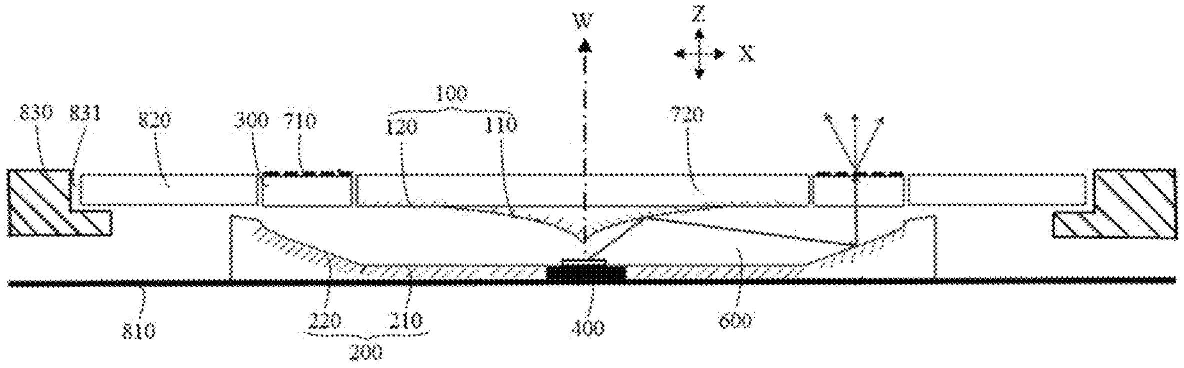
FIG. 1 is a schematic cross-sectional view of a fill light according to an embodiment of this application.
Figure 2:
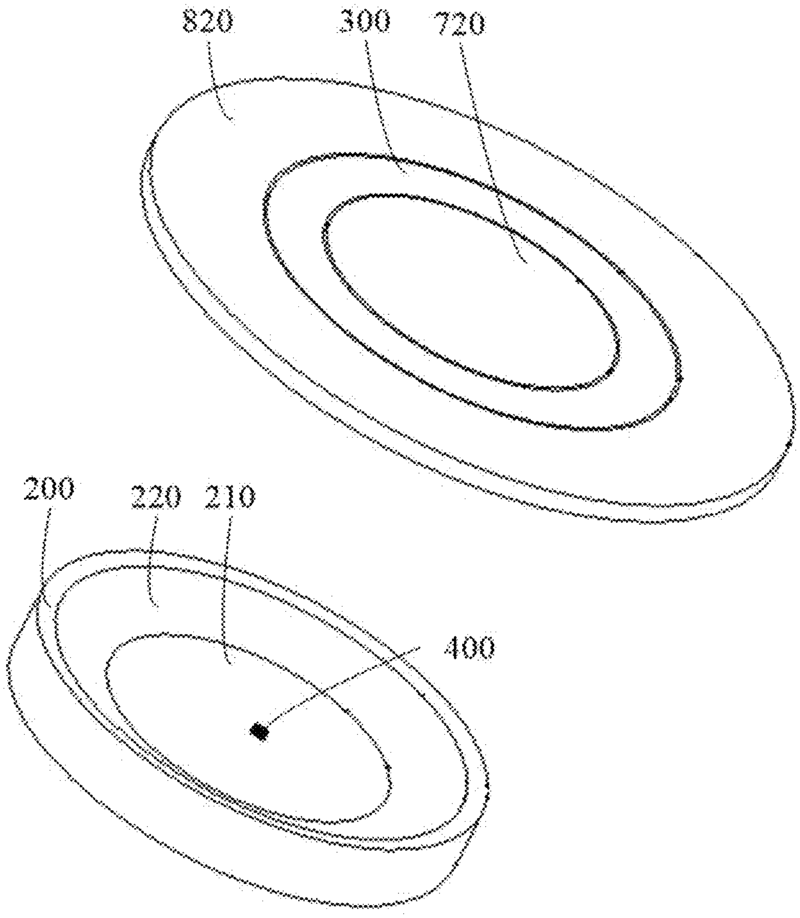
FIG. 2 and FIG. 3 are diagrams of a structure of a fill light according to an embodiment of this application.
Figure 3:
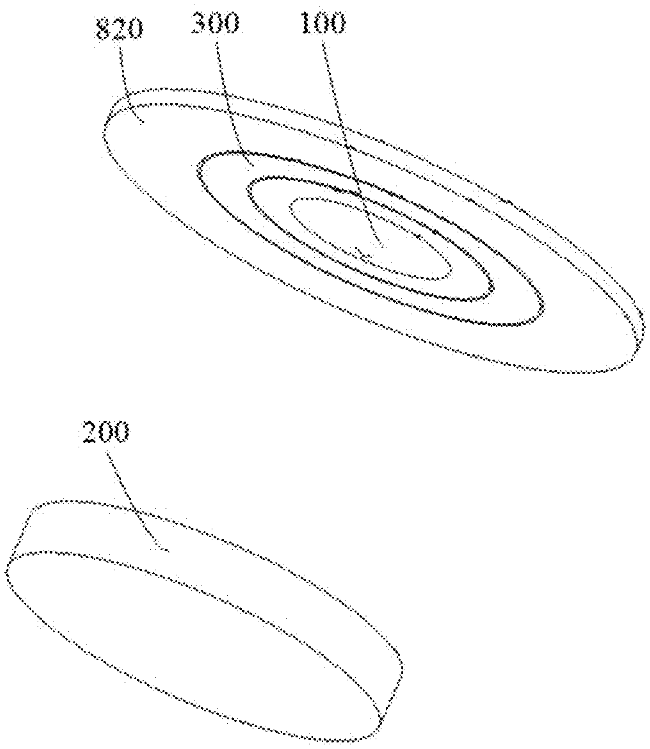

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms “first”, “second”, and the like in this specification and claims of this application are used to distinguish between similar objects instead of describing a specific order or sequence. It should be understood that the data used in such a way is interchangeable in proper circumstances, so that the embodiments of the present application described herein can be implemented in an order other than the order illustrated or described herein. In addition, in this specification and the claims, “and/or” indicates at least one of connected objects, and a character “/” generally indicates an “or” relationship between associated objects.

With reference to the accompanying drawings, a fill light and an electronic device provided in embodiments of this application are described below in detail by using specific embodiments and application scenarios thereof.

Referring to FIG. 1 to FIG. 6, embodiments of this application disclose a fill light. The fill light is used in an electronic device. The disclosed fill light includes a first reflector 100, a second reflector 200, a light-transmitting ring 300, and a light-emitting light source 400.

The light-emitting light source 400 may be a light-emitting diode (LED) lamp, a high pressure sodium lamp, a metal halide lamp, and the like. The light-emitting light source 400 of the fill light may be of another structure. This is not limited herein.

The first reflector 100 and the light-transmitting ring 300 are both located on a same side of the second reflector 200, and the light-transmitting ring 300 is disposed around the first reflector 100. In some embodiments, the first reflector 100 has a first reflection surface for reflecting light, and the second reflector 200 has a second reflection surface for reflecting light. The first reflection surface is disposed opposite to the second reflection surface. In this case, the first reflection surface and the second reflection surface can reflect light from each other.

A light-emitting side of the light-emitting light source 400 faces the first reflection surface. The first reflection surface, the second reflection surface, and the light-transmitting ring 300 are all rotationally symmetrical about a central optical axis W of the light-emitting light source 400. In this case, first reflection surface, the second reflection surface, and the light-transmitting ring 300 are all of rotationally symmetrical structures that are coaxially disposed. The central optical axis W of the light-emitting light source 400 here can be understood as a central axis in its light-emitting direction, and can be also understood as a central axis of a physical center of the light-emitting light source 400.

During a specific operation, light emitted by the light-emitting light source 400 is emitted from the light-transmitting ring 300 after being reflected by the first reflection surface and the second reflection surface, to form a light ring with soft light perception, moderate brightness, and continuous emission on the light-transmitting ring 300.

In embodiments disclosed in this application, the first reflection surface, the second reflection surface, and the light-transmitting ring 300 are all rotationally symmetrical about the central optical axis W of the light-emitting light source 400. Therefore, illuminance distribution of the reflected light of the first reflection surface and the second reflection surface in a circumferential direction thereof is uniform, so that light of the fill light is more uniform. In addition, the light emitted by the light-emitting light source 400 is reflected between the first reflection surface and the second reflection surface, so that the first reflection surface and the second reflection surface form a coaxial dual-reflection structure. The coaxial dual-reflection structure can be used for light guidance, to reduce a quantity of reflections of light, and maximize an amount of light guided to the light-transmitting ring 300. In this way, luminous energy efficiency of the fill light can be significantly improved, so that the fill light has sufficient energy even with a single light source. In this solution, light is guided by using the coaxial dual-reflection structure, so that a quantity of light sources of the fill light can be effectively reduced. This enables the fill light to be smaller in size, lower in cost, and better in heat dissipation performance. Therefore, use performance of the fill light is improved.

In addition, the reflection structure of the fill light disclosed in this application adopts a coaxial dual-reflection and rotationally symmetrical structure. Therefore, luminous intensity of the light-transmitting ring 300 in a circumferential direction is the same, so that the fill light has both sufficient luminous energy and good luminous uniformity. In this case, the fill light has good optical performance.

In the foregoing embodiment, for a more beautiful and compact structure of the fill light, in some embodiments, the first reflector 100 and the second reflector 200 are both rotationally symmetrical about the central optical axis W of the light-emitting light source 400. In this solution, the first reflector 100 and the second reflector 200 are both of rotationally symmetrical structures, so that the structure of the fill light is more beautiful and compact.

In some embodiments, the first reflection surface includes a first concave region 110. A distance between any point on the first concave region 110 and the central optical axis W of the light-emitting light source 400 is a first distance, a distance between any point on the first concave region 110 and a plane on which the light-emitting light source 400 is located is a second distance.

The first distance herein is a vertical distance between any point on the first concave region 110 and the central optical axis W, the second distance is a vertical distance between the point and the plane on which the light-emitting light source 400 is located, and the first distance is positively correlated with the second distance. A positive correlation means that as one variable increases, the other variable increases. The two variables change in a same direction. Specifically, when one variable changes from large to small or from small to large, the other variable changes from large to small or from small to large. It may be understood that an arc formed by intersection between a plane on which the central optical axis is located and the first reflection surface is a two-segment arc with an upward opening, where a direction of the upward opening is a direction in which the opening is away from the light-emitting light source.

The first reflection surface is rotationally symmetrical about the central optical axis W. Therefore, the first concave region 110 is also rotationally symmetrical about the central optical axis W. When the first concave region 110 is of a rotationally symmetrical structure, a change direction of the first distance and the second distance can only be an extension direction of the central optical axis W.

In this solution, the first distance and the second distance change in the extension direction of the central optical axis W, either both increasing or both decreasing, so that the first concave region 110 is of a tapered structure with an edge area larger than a middle area. In this case, a peripheral side of the first concave region 110 extends obliquely outward. The first concave region 110 is of a horn-shaped structure, and a surface of the horn-shaped structure can increase a reflection angle at which light is reflected toward an outer edge, thereby improving reflection performance of light.

Therefore, a quantity of reflections of light can be reduced, and optical performance of the fill light can be further improved.

In the foregoing solution, the first concave region 110 is of a rotationally symmetrical structure, so that first distances of all points on a circumference of a same radius of the first concave region 110 are the same, and second distances of all the points are the same.

Figure 4:
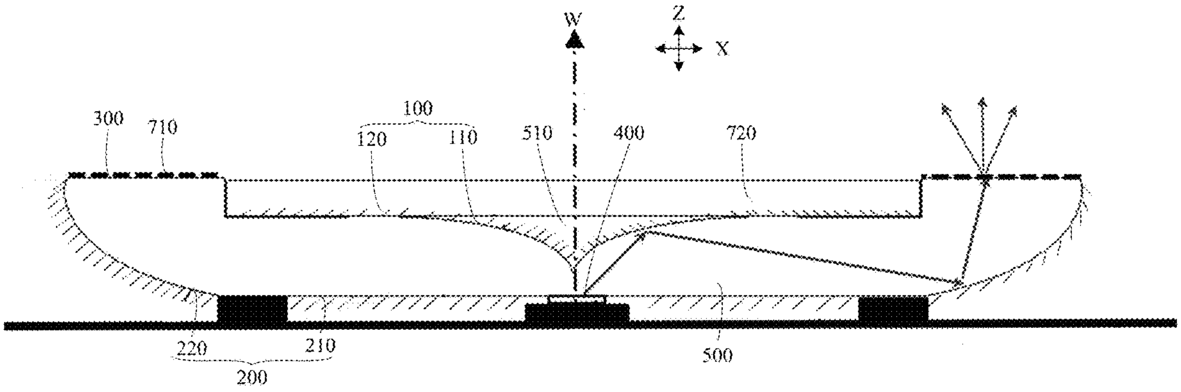
FIG. 4 is a schematic cross-sectional view of another fill light according to an embodiment of this application.
Figure 5:
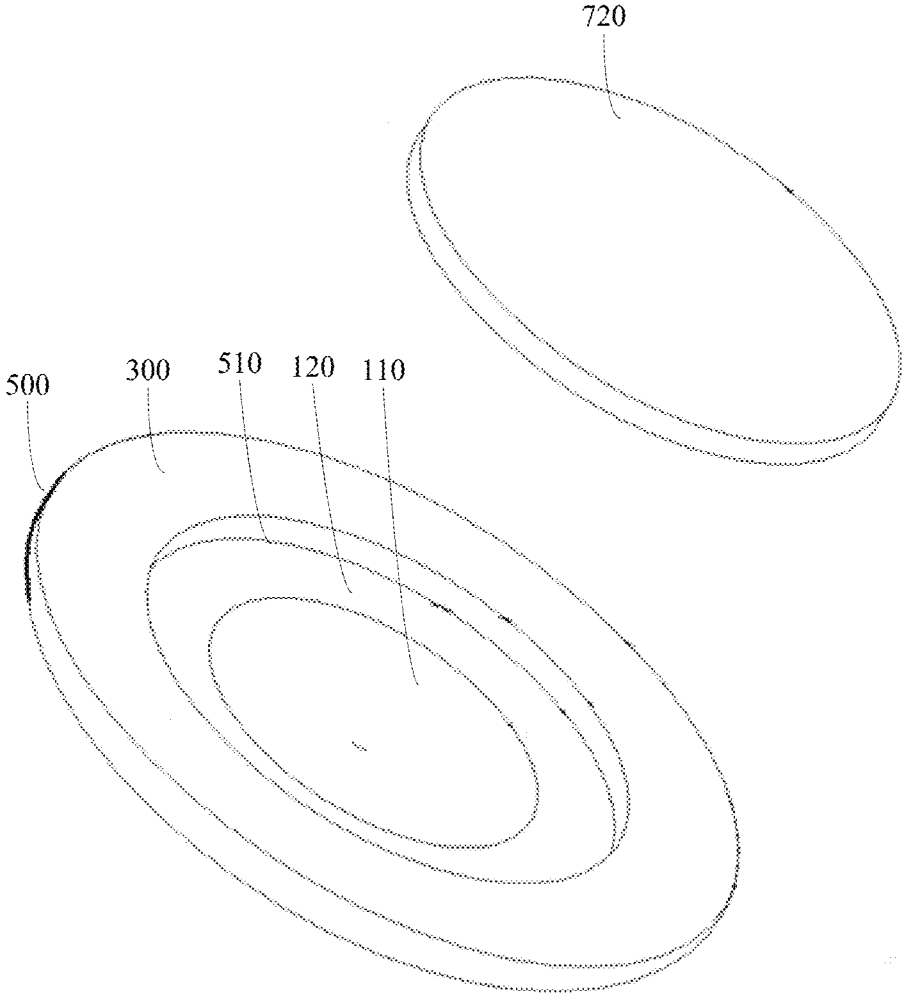
FIG. 5 and FIG. 6 are diagrams of a structure of a fill light according to an embodiment of this application.
Figure 6:
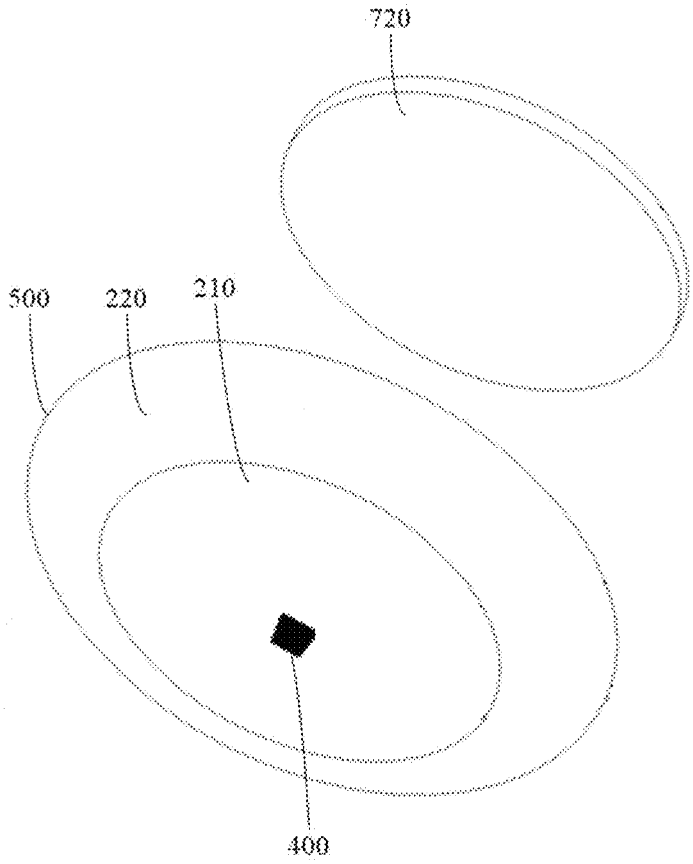

In some embodiments, in a direction in which the first reflection surface points to the second reflection surface, for example, in a vertical downward direction in FIG. 1 and FIG. 4, a cross-sectional area of the first concave region 110 in a direction perpendicular to the central optical axis W gradually decreases. In other words, the radius of the first concave region 110 gradually decreases. In some embodiments, in a direction in which the first reflection surface points to the second reflection surface, for example, in a vertical downward direction in FIG. 1 and FIG. 4, a cross-sectional area of the first concave region 110 in a direction perpendicular to the central optical axis W gradually increases. In other words, the radius of the first concave region 110 gradually increases.

Light reflection efficiency of the first concave region 110 varies according to different concave directions of the first concave region 110. For example, the first concave region 110 protrudes toward a direction of the second reflection surface. In this case, the reflection angle at which light is reflected toward the outer edge is larger. Therefore, a quantity of reflections of light can be reduced, and optical performance of the fill light can be further improved.

In some embodiments, the first concave region 110 may be formed by rotating the first curve with the central optical axis W of the light-emitting light source 400 as a rotation axis. The first curve herein is a surface line profile of the first concave region 110, and the surface line profile herein is a line segment that, when rotated one revolution around a specific position, forms a specified contour. A surface contour of the first concave region 110 in this application is obtained by rotating the first curve one revolution around the central optical axis W. The first curve may be a Bezier curve. In this case, the surface line profile of the first concave region 110 is a Bezier curve.

As a mathematical curve used in two-dimensional graphics applications, the Bezier curve is a smooth curve drawn based on coordinates of four points at arbitrary positions, and controls the four points on the curve (a start point, an end point and two separate intermediate points) to adjust a direction and curvature of the curve.

The first curve is a Bezier curve, and the Bezier curve is jointly determined by parameters such as a start point position, a start point tangent angle, a start point tangent length, an end point position, an end point tangent angle, and an end point tangent length. A specific parameter value of the first curve may be flexibly selected according to an actual requirement. This is not limited herein.

In this solution, the first concave region 110 is obtained by rotating the Bezier curve one revolution around the central optical axis W. Therefore, a surface profile of the first reflection surface can be further optimized by optimizing a line profile of the Bezier curve, to implement accurate light guide. In this way, light can reach the light-transmitting ring 300 with the least number of reflection times, so that light energy emitted from the light-transmitting ring 300 is further improved, and optical performance of the fill light is further improved.

In a specific solution, as shown in FIG. 1 and FIG. 4, parameters of the first curve are shown in Table 1 below:

TABLE 1

| | Start point | End point |
|---|---|---|
| X-axis relative coordinate | 0 mm | 3 mm |
| Z-axis relative coordinate | 0.4642 mm | 1.2 mm |
| Tangent angle | 32.675° | −95.172° |
| Tangent length | 0.5855 mm | 0 |

The data parameter coordinates in Table 1 above can determine the first curve, and the surface contour of the first concave region 110 is obtained by rotating the first curve around the central optical axis W. The parameters such as the start point, the start point tangent angle, the start point tangent length, the end point, the end point tangent angle, and the end point tangent length of the first curve are not limited to the data in Table 1. In a case that start point coordinates and end point coordinates are unchanged, the data parameters such as the start point tangent angle, the start point tangent length, the end point tangent angle, and the end point tangent length may vary within a range of ±10%.

In some embodiments, the first reflection surface may further include a first planar region 120. The first planar region 120 is located on a side that is of the first concave region 110 and that is away from the central optical axis W, and is disposed in parallel with the light-transmitting ring 300. In this case, the first planar region 120 is of an annular structure and is located at an edge of the first concave region 110. The first planar region 120 is also rotationally symmetrical about the central optical axis W.

In this solution, the first planar region 120 can prevent an excessively large reflection angle at an edge of the first reflector 100, thereby further improving optical performance of the fill light.

In a specific solution, an X-axis coordinate of the end point of the first curve is 3 mm, so that an X-axis relative coordinate of an inner diameter of the first planar region 120 is 3 mm, and an X-axis relative coordinate of an outer diameter of the first planar region 120 is 4.5 mm. In this case, a width of the first planar region 120 is 1.5 mm. The width of the first planar region 120 may be flexibly selected according to an actual requirement. This is not limited herein.

It can be learned from the foregoing solution that the outer diameter of the first concave region 110 is the inner diameter of the first planar region 120.

In some embodiments, the second reflection surface includes a second concave region 220. A distance between any point on the second concave region 220 and the central optical axis W of the light-emitting light source 400 may be a third distance, a distance between any point on the second concave region 220 and a plane on which the light-emitting light source 400 is located may be a fourth distance. The third distance may be positively correlated with the fourth distance.

The third distance herein is a vertical distance between any point on the second concave region 220 and the central optical axis W. The fourth distance is a vertical distance between the point and the plane on which the light-emitting light source 400 is located. The concept of positive correlation has been described previously and is not described herein again.

The second reflection surface is rotationally symmetrical about the central optical axis W. Therefore, the second concave region 220 is also rotationally symmetrical about the central optical axis W. When the second concave region 220 is of a rotationally symmetrical structure, a change direction of the third distance and the fourth distance can only be an extension direction of the central optical axis W.

In this solution, the third distance and the fourth distance change in the extension direction of the central optical axis W, either both increasing or both decreasing, so that the second concave region 220 is of a tapered structure with an edge area larger than a middle area. In this case, a peripheral side of the second concave region 220 extends obliquely outward. The second concave region 220 is of a horn-shaped structure, and a surface of the horn-shaped structure can increase a reflection angle at which light is reflected toward an outer edge, thereby improving reflection performance of light. Therefore, a quantity of reflections of light can be reduced, and optical performance of the fill light can be further improved.

In the foregoing solution, the second concave region 220 is of a rotationally symmetrical structure, so that in a direction perpendicular to the central optical axis W, third distances of all points on a circumference of a same radius of the second concave region 220 are the same, and fourth distances of all the points are the same.

In some embodiments, the second concave region 220 is recessed in a direction toward the first reflection surface, that is, the second concave region 220 protrudes in the direction toward the first reflection surface. In this case, in the direction in which the first reflection surface points to the second reflection surface, for example, in a vertical downward direction in FIG. 1 and FIG. 4, a cross-sectional area of the second concave region 220 in the direction perpendicular to the central optical axis W gradually increases. In this solution, a reflection angle at which light is reflected toward an outer edge can be further increased.

In some embodiments, the second concave region 220 is recessed in a direction away from the first reflection surface, that is, the second concave region 220 protrudes in the direction away from the first reflection surface. In this case, in the direction in which the first reflection surface points to the second reflection surface. For example, in a vertical downward direction in FIG. 1 and FIG. 4, a cross-sectional area of the second concave region 220 in the direction perpendicular to the central optical axis W gradually decreases. In this solution, the second concave region 220 has good light collection performance while increasing the reflection angle, so that more light can be emitted to the light-transmitting ring 300, and optical performance of the fill light can be further improved.

In some embodiments, the second concave region 220 is rotationally symmetrical about the central optical axis W. In other words, the second concave region 220 is an annular concave surface that surrounds the central optical axis W.

Further, the second concave region 220 may be formed by rotating the second curve with the central optical axis W of the light-emitting light source 400 as the rotation axis. The second curve herein is a surface line profile of the second concave region 220, and the surface contour of the second concave region 220 in this application may be obtained by rotating the second curve one revolution around the central optical axis W. The second curve may be a Bezier curve. In this case, the surface line profile of the second concave region 220 is a Bezier curve. It may be understood that although both the first curve and the second curve are Bezier curves, parameters of the first curve and the second curve are different. For example, parameters such as control end-points, moving points, curvature changes, orders of the first curve and the second curve are different.

The second curve is determined jointly by parameters such as a start point position, a start point tangent angle, a start point tangent length, an end point position, an end point tangent angle, and an end point tangent length. A specific parameter value of the second curve may be flexibly selected according to an actual requirement. This is not limited herein.

In some embodiments, as shown in FIG. 1 and FIG. 4, parameters of the second curve are shown in Table 2 below:

TABLE 2

| | Start point | End point |
|---|---|---|
| X-axis relative coordinate | 4.4 mm | 6.4 mm |
| Z-axis relative coordinate | 0 mm | −0.9 mm |
| Tangent angle | 109.56° | −4.3074° |
| Tangent length | 2.5374 mm | 0.0874 mm |

The data parameter coordinates in Table 2 above can determine the second curve, and the surface contour of the second concave region 220 is obtained by rotating the second curve around the central optical axis W. The parameters such as the start point, the start point tangent angle, the start point tangent length, the end point, the end point tangent angle, and the end point tangent length of the second curve are not limited to the data in Table 2. In a case that start point coordinates and end point coordinates are unchanged, the data parameters such as the start point tangent angle, the start point tangent length, the end point tangent angle, and the end point tangent length may vary within a range of ±10%.

The first curve and the second curve may be located in a same coordinate system, and an origin of the coordinate system may be a center of the light-emitting light source 400.

In this solution, the second concave region 220 is obtained by rotating the Bezier curve one revolution around the central optical axis W. Therefore, a surface profile of the first reflection surface can be further optimized by optimizing a line profile of the Bezier curve, to implement accurate light guide. In this way, light can reach the light-transmitting ring 300 with the least number of reflection times, so that light energy emitted from the light-transmitting ring 300 is further improved, and optical performance of the fill light is further improved.

In some embodiments, the second reflection surface may further include a second planar region 210. The second planar region 210 may be located on a side that is of the second concave region 220 and that is close to the central optical axis W, and is disposed in parallel with the light-transmitting ring 300. The second planar region 210 is also rotationally symmetrical about the central optical axis W. In this solution, a middle region of the second reflector 200 is disposed in a circular structure, so that reflection performance of the second reflector 200 can be enhanced. In this way, more light can be reflected onto the first reflector 100, thereby further improving light fill effect of the fill light.

In some embodiments, an X-axis coordinate of the start point of the first curve is 4.4 mm, so that an X-axis relative coordinate of a radius of the second planar region 210 is 4.4 mm. In this case, the radius of the second planar region 210 is 4.4 mm. The radius of the second planar region 210 may be of another size. This is not limited herein.

In this case, the inner diameter of the second concave region 220 is the radius of the first planar region 210.

In the foregoing embodiment, the second concave region 220 extends from an outer edge of the second planar region 210, and in the direction in which the first reflection surface points to the second reflection surface, the second concave region 220 gradually deviates away from the central optical axis W. For example, in a Z-axis negative direction in FIG. 1 and FIG. 4, that is, in the vertical downward direction, the cross-sectional area of the second concave region 220 in the direction perpendicular to the central optical axis W gradually increases. In other words, the radius of the second concave region 220 gradually increases. In this case, the second planar region 210 is closer to the first reflection surface than the second concave region 220. In this case, in the Z-axis negative direction in FIG. 1 and FIG. 4, the second concave region 220 is disposed divergently from an edge region of the second planar region 210 in a direction away from the central optical axis W. The second reflector in this embodiment herein may be a boss structure. The second concave region 220 is an outer surface of the boss structure, and the second planar region 210 is a top surface of the boss structure.

Further, in the Z-axis negative direction, a tangent slope of the second concave region 220 gradually increases. In other words, the tangent slope changes as the radius of the second concave region 220 changes. The tangent slope is positively correlated with the radius. A greater tangent slope indicates a larger reflection angle of the second concave surface.

In some embodiments, the second concave region 220 extends from the outer edge of the second planar region 210, and in the direction in which the first reflection surface points to the second reflection surface, the second concave region 220 gradually approaches the central optical axis W. In the Z-axis negative direction, the cross-sectional area of the second concave region 220 in the direction perpendicular to the central optical axis W gradually decreases. In other words, the radius of the second concave region 220 gradually decreases. Further, in another direction, namely, a Z-axis positive direction in FIG. 1 and FIG. 4, the second concave region 220 is disposed divergently from the edge region of the second planar region 210 in the direction away from the central optical axis W.

In this case, the second planar region 210 is away from the first reflection surface than the second concave region 220. Therefore, the second reflector is equivalent to be provided with a groove structure. The second concave region 220 is a side wall of the groove structure, and the second planar region 210 is a bottom wall of the groove structure.

Further, in the direction in which the first reflection surface points to the second reflection surface, namely, the Z-axis negative direction in FIG. 1, the tangent slope of the second concave region 220 gradually decreases. In other words, the tangent slope changes as the radius of the second concave region 220 changes. The tangent slope is positively correlated with the radius.

In an embodiment, as shown in FIG. 1 and FIG. 4, in the direction in which the first reflection surface points to the second reflection surface, for example, in the Z-axis negative direction in FIG. 1 and FIG. 4, the cross-sectional area of the first concave region 110 in the direction perpendicular to the central optical axis W gradually decreases. In addition, the cross-sectional area of the second concave region 220 in the direction perpendicular to the central optical axis W also gradually decreases. In this case, the first reflection surface is a concave structure that faces the second reflection surface, and the second reflection surface is a concave structure that faces the first reflection surface. The first reflection surface that faces an edge side can increase a reflection angle of light, while the second reflection surface functions to converge the light, so that light collection effect is good. Therefore, in this solution, optical performance of the fill light can be further improved.

In some embodiments, in a direction along the central optical axis W of the light-emitting light source 400, an orthographic projection of the first reflection surface and an orthographic projection of the light-transmitting ring 300 may be both located in an orthographic projection of the second reflection surface. In this solution, more light can be reflected onto the light-transmitting ring 300, and optical performance of the fill light can be further improved.

In some embodiments, in the direction along the central optical axis W of the light-emitting light source 400, at least a portion of the orthographic projection of the first reflection surface may be located in the orthographic projection of the second planar region 210, and at least a portion of the orthographic projection of the light-transmitting ring 300 may be located in the orthographic projection of the second concave region 220.

In some embodiments, the fill light may further include a decorative cover 720. The light-transmitting ring 300 may be disposed around the decorative cover 720, and the first reflector 100 may be disposed on a side that is of the decorative cover 720 and that faces the second reflector 200. In this solution, the decorative cover 720 can cover the first reflector 100, to prevent exposure of the first reflector 100, thereby improving external light performance of the fill light.

In the solution shown in FIG. 1, the decorative cover 720 may be used as a mounting base the first reflector 100, and the first reflector 100 may be attached to a surface of a side that is of the decorative cover 720 and that faces the second reflector 200.

In some embodiments, the fill light may further include a light guide member 500, and the first reflector 100, the light-transmitting ring 300, and the second reflector 200 may be all disposed on an outer surface of the light guide member 500. In this case, the light guide member 500 is used as a basis for assembly of the first reflector 100, the second reflector 200, and the light-transmitting ring 300. It may be understood that the first reflector 100, the second reflector 200, and the light-transmitting ring 300 are different regions on the light guide member 500. An outer surface of the light guide member 500 has a light incident region, and the light incident region may be disposed opposite to the light-emitting side of the light-emitting light source 400.

In a specific light fill process, light emitted by the light-emitting light source 400 enters the light guide member 500 through the light incident region, and the light is reflected or refracted within the light guide member 500, and then is emitted through the light-transmitting ring 300.

In this solution, the light reflected or refracted between the first reflector 100 and the second reflector 200 are reflected or refracted within the light guide member 500. In this way, the light is reflected or refracted within a same light guide medium, and reflection efficiency of reflected light of all parts of the light is the same. Therefore, optical performance of the fill light can be further improved.

In addition, the light guide member 500 is used as a mounting base the first reflector 100, the second reflector 200, and the light-transmitting ring 300, so that the fill light can be separately assembled, without relying on another component of the electronic device.

In some embodiments, the light guide member 500 may be made of a material such as light-transmitting glass or resin. In some embodiments, the light guide member 500 may be made of another material. This is not limited herein.

In some embodiments, as shown in FIG. 1, the first reflector 100, the second reflector 200, and the light-transmitting ring 300 may surround an optical reflection space 600. In this solution, the first reflector 100, the second reflector 200, and the light-transmitting ring 300 surround the optical reflection space 600, so that light loss can be reduced, and optical performance of the fill light can be improved.

In the solution shown in FIG. 1, a transmission medium between the first reflector 100 and the second reflector 200 is air. In the solution shown in FIG. 4, a transmission medium between the first reflector 100 and the second reflector 200 is the light guide member 500, and the light guide member 500 is a physical structure. Therefore, the light transmission media in the solution shown in FIG. 1 and the solution shown in FIG. 4 are different.

In the solution shown in FIG. 4, both the first reflector 100 and the light-transmitting ring 300 are disposed on a surface of a side of the light guide member 500. If the decorative cover 720 directly covers the first reflector 100, a height of the decorative cover 720 is higher than a height of the light-transmitting ring 300. This results in a height difference between the light-transmitting ring 300 and the decorative cover 720, so that a thickness of the fill light is large.

To this end, in some embodiments, the light guide member 500 may be provided with an accommodation groove 510, and the first reflector 100 may be disposed on a bottom wall of the accommodation groove 510. The fill light may further include a decorative cover 720. The decorative cover 720 is disposed covering the first reflector 100, and the decorative cover 720 may be disposed in the accommodation groove 510. In this solution, the light guide member 500 is provided with the accommodation groove 510, and the decorative cover 720 is hidden in the accommodation groove 510. In this way, a top surface of the decorative cover 720 can be aligned with the light-transmitting ring 300, so that a thickness of the fill light is small.

In the foregoing embodiment, the light-emitting light source 400 may be located between the first reflection surface and the second reflection surface. In this case, the light-emitting light source 400 occupies light transmission space. To this end, In some embodiments, the second reflector 200 may be provided with a through hole, the light-emitting light source 400 may be located in the through hole, and a light-emitting side of the light source faces the first reflector 100. In this solution, the light-emitting light source 400 is located in the through hole, thereby avoiding occupation of light transmission space and minimizing impact on light transmission. In some embodiments, the through hole may be provided on the second planar region 210.

In some embodiments, the fill light may further include a diffusion film 710. The diffusion film 710 may be disposed on a light-emitting surface of the light-transmitting ring 300. In this case, the diffusion film 710 may cover a surface of the light-transmitting ring 300. When passing through the diffusion film 710, light passes through media with different refractive indexes, causing numerous phenomena of refraction, reflection, and scattering of the light. The light can be corrected to form a uniform surface light source, to achieve an optical diffusion effect.

In this solution, the diffusion film 710 can scatter light on the light-emitting surface, so that the light is more gently and evenly dispersed, thereby further improving optical performance of the fill light. In addition, the diffusion film 710 has a frosted visual effect, thereby enhancing aesthetic appearance of the fill light.

In some embodiments, an area of the diffusion film 710 may be the same as an aperture of the light-emitting surface of the light-transmitting ring 300. Scattering of light by the diffusion film 710 conforms to Gaussian distribution, and a standard deviation of the Gaussian distribution may be 8°.

In In some embodiments, an outer surface of the light-transmitting ring 300 may be flush with a surface of a side that is of the decorative cover 720 and that is away from the first reflector 100. In this solution, external light performance of the fill light can be further improved.

Illuminance distribution experiments were conducted on projection surfaces at a distance of 1000 mm for the solutions shown in FIG. 1 and FIG. 4. For the solution shown in FIG. 1, the distribution experiment conducted on the projection surface at the distance of 1000 mm shows a rectangular covered field of view and a maximum field of view of ±40°. A luminance uniformly decreases as the field of view increases, with a maximum illuminance of 54.3 lux, a minimum illuminance of 15.7 lux, and illuminance uniformity of greater than 28.5%. Performance of the fill light is comparable to that of conventional flashlight. The light-emitting light source 400 emits a luminous flux of 300 lumens, while the projection surface receives 50.6 lumens, leading to energy efficiency of greater than 16.5%. Light intensity of the fill light is similar to that of conventional flashlight.

For the solution shown in FIG. 4, the distribution experiment conducted on the projection surface at the distance of 1000 mm shows a rectangular covered field of view and a maximum field of view of ±40°. A luminance uniformly decreases as the field of view increases, with a maximum illuminance of 50.9 lux, a minimum illuminance of 14.6 lux, and illuminance uniformity of greater than 28.5%. Performance of the fill light is comparable to that of conventional flashlight. The light-emitting light source 400 emits a luminous flux of 300 lumens, while the projection surface receives 43 lumens, leading to energy efficiency of greater than 14.3%. Light intensity of the fill light is similar to that of conventional flashlight.

In view of the above, the light intensity of the fill light disclosed in this application is equivalent to that of conventional flashlight, while offering characteristics including soft light perception, moderate brightness, and continuous light fill. In addition, compared with annular soft light fill solution in a related technology, the fill light disclosed in this application guides light by using a coaxial dual-reflection structure, so that a quantity of light sources of the fill light can be effectively reduced. In this way, the fill light disclosed in this application is smaller in size, lower in cost, and better in heat dissipation performance. Therefore, the fill light disclosed in this application has better use performance.

Based on the fill light disclosed in embodiments of this application, an embodiment of this application further discloses an electronic device. The disclosed electronic device includes the fill light in any one of the foregoing embodiments.

The electronic device disclosed in this application may further include a circuit board 810. The circuit board 810 herein may be a main board of the electronic device or an auxiliary board of the electronic device. The light-emitting light source 400 of the fill light may be disposed on the circuit board 810, and the circuit board 810 supplies power to the light-emitting light source 400 of the fill light, and controls on and off of the light-emitting light source 400.

In some embodiments, the fill light is an integral packaging structure, and may be directly mounted on the circuit board 810 of the electronic device. An annular light-transmitting hole may be disposed on a housing of the electronic device. The light-transmitting hole is directly opposite to the light-transmitting ring 300 of the fill light, so that light emitted by the fill light is emitted from the housing 830 of the electronic device through the light-transmitting hole. In this case, the fact that the fill light is an integral packaging structure simplifies an assembly process and facilitates application to the electronic device.

In some embodiments, in the solution shown in FIG. 1, the second reflector 200 may be directly coated on the circuit board 810, and the circuit board 810 is a mounting base of the second reflector 200. In the solution shown in FIG. 4, the light-emitting light source 400 is located between the light guide member 500 and the circuit board 810, and the circuit board 810 is a mounting base the light guide member 500. To enhance mounting stability of the light guide member 500, a support member may be further disposed at an edge position of the light guide member 500, and the support member is disposed between the light guide member 500 and the circuit board 810.

In some embodiments, the electronic device further includes a housing 830. The housing 830 provides a mounting base for another component of the electronic device. The housing 830 may be provided with a mounting hole 831. The light-transmitting ring 300 and the decorative cover 720 may be both mounted in the mounting hole 831, and the first reflector 100, the second reflector 200, and the light-transmitting ring 300 may surround an optical reflection space 600.

In this solution, components of the fill light are distributed on different components of the electronic device, and another component of the electronic device is used as a mounting base for the components of the fill light. In this way, flexibility of assembly of the electronic device is improved, and space utilization of the electronic device is improved.

In some embodiments, the fill light may further include a fastening plate 820. The fastening plate 820 is disposed around the light-transmitting ring 300. The light-transmitting ring 300 is fastened to the housing 830 of the electronic device through the fastening plate 820. In some embodiments, the light-transmitting ring 300 is fastened to a rear cover of the electronic device through the fastening plate 820.

Further, to improve an external light effect of the fill light, the light-emitting light source 400, the first reflector 100, the second reflector, the mounting hole 831, the fastening plate 820, the light-transmitting ring 300, and the diffusion film may all be rotationally symmetrical about the central optical axis.

The electronic device in this embodiment of this application may be a device, such as a smart phone, a tablet computer, an e-book reader, a wearable device (for example, a smartwatch), a video game console, and the like. A specific type of the electronic device is not limited in this embodiment of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A fill light, comprising:

a first reflector having a first reflection surface;

a second reflector having a second reflection surface disposed opposite to the first reflection surface of the first reflector;

a light-transmitting ring surrounding the first reflector; and a light-emitting light source, wherein a light-emitting side of the light-emitting light source faces the first reflection surface, and light emitted by the light-emitting light source is emitted from the light-transmitting ring after being reflected by the first reflection surface and the second reflection surface, wherein the first reflector and the light-transmitting ring are located on a same side of the second reflector, the first reflection surface, the second reflection surface, and the light-transmitting ring are all rotationally symmetrical about a central optical axis of the light-emitting light source, and the second reflection surface comprises a second concave region, wherein:

a distance between any point on the second concave region and the central optical axis of the light-emitting light source is a third distance, a distance between the any point on the second concave region and a plane on which the light-emitting light source is located is a fourth distance, the third distance is positively correlated with the fourth distance, and the second concave region is formed by rotating a second curve around the central optical axis of the light-emitting light source as a rotation axis, the second curve being a Bezier curve.

2. The fill light according to claim 1, wherein the first reflection surface comprises a first concave region, wherein a distance between any point on the first concave region and the central optical axis of the light-emitting light source is a first distance, a distance between the any point on the first concave region and the plane on which the light-emitting light source is located is a second distance, and the first distance is positively correlated with the second distance.

3. The fill light according to claim 2, wherein the first concave region is formed by rotating a first curve around the central optical axis of the light-emitting light source as a rotation axis, the first curve being a Bezier curve.

4. The fill light according to claim 2, wherein the first reflection surface further comprises a first planar region, and the first planar region is located on a side that is of the first concave region and that is away from the central optical axis, and is disposed in parallel with the light-transmitting ring.

5. The fill light according to claim 1, wherein the second reflection surface further comprises a second planar region, and the second planar region is located on a side that is of the second concave region and that is close to the central optical axis, and is disposed in parallel with the light-transmitting ring.

6. The fill light according to claim 1, wherein in a direction along the central optical axis of the light-emitting light source, an orthographic projection of the first reflection surface and an orthographic projection of the light-transmitting ring are both located in an orthographic projection of the second reflection surface.

7. The fill light according to claim 1, wherein the fill light further comprises a decorative cover, the light-transmitting ring is disposed around the decorative cover, and the first reflector is disposed on a side that is of the decorative cover and that faces the second reflector.

8. The fill light according to claim 7, wherein an outer surface of the light-transmitting ring is flush with a surface of a side that is of the decorative cover and that is away from the first reflector.

9. The fill light according to claim 1, wherein the fill light further comprises a light guide member, and the first reflector, the light-transmitting ring, and the second reflector are all disposed on an outer surface of the light guide member.

10. The fill light according to claim 9, wherein the light guide member is provided with an accommodation groove, the first reflector is attached on a bottom wall of the accommodation groove, and the fill light further comprises a decorative cover disposed in the accommodation groove.

11. The fill light according to claim 1, wherein the fill light further comprises a diffusion film disposed on a light-emitting surface of the light-transmitting ring.

12. An electronic device, comprising:

a fill light, comprising:

a first reflector having a first reflection surface;

a second reflector having a second reflection surface disposed opposite to the second reflection surface of the first reflector;

a light-transmitting ring surrounding the first reflector; and a light-emitting light source, wherein a light-emitting side of the light-emitting light source faces the first reflection surface, light emitted by the light-emitting light source is emitted from the light-transmitting ring after being reflected by the first reflection surface and the second reflection surface, wherein the first reflector and the light-transmitting ring are located on a same side of the second reflector, the first reflection surface, the second reflection surface, and the light-transmitting ring are all rotationally symmetrical about a central optical axis of the light-emitting light source, and the first reflection surface comprises a first concave region, wherein:

a distance between any point on the first concave region and the central optical axis of the light-emitting light source is a first distance, a distance between the any point on the first concave region and a plane on which the light-emitting light source is located is a second distance, the first distance is positively correlated with the second distance, and the first concave region is formed by rotating a first curve around the central optical axis of the light-emitting light source as a rotation axis, the first curve being a Bezier curve.

13. The electronic device according to claim 12, further comprising a circuit board, and the light-emitting light source is disposed on the circuit board.

14. The electronic device according to claim 13, further comprising:

a housing provided with a mounting hole, wherein the fill light further comprises a decorative cover, the light-transmitting ring is disposed around the decorative cover, and the first reflector is disposed on a surface of a side that is of the decorative cover and that faces the light-emitting light source, and the light-transmitting ring and the decorative cover are both mounted in the mounting hole, and the first reflector, the second reflector, and the light-transmitting ring surround an optical reflection space.

15. The electronic device according to claim 12, wherein in the fill light, the second reflection surface comprises a second concave region, wherein a distance between any point on the second concave region and the central optical axis of the light-emitting light source is a third distance, a distance between the any point on the second concave region and the plane on which the light-emitting light source is located is a fourth distance, and the third distance is positively correlated with the fourth distance.

16. The electronic device according to claim 15, wherein the second concave region is formed by rotating a second curve around the central optical axis of the light-emitting light source as a rotation axis, the second curve being a Bezier curve.

* * * * *